United States Patent [19]
Carlsson

[11] Patent Number: 6,026,302
[45] Date of Patent: Feb. 15, 2000

[54] SYSTEM AND METHOD FOR LOAD REDUCTION IN A MOBILE COMMUNICATION SYSTEM AND A MOBILE COMMUNICATION SYSTEM

[75] Inventor: Goran Carlsson, Stenhamra, Sweden

[73] Assignee: Telefonaktiebolaget LM Ericsson, Stockholm, Sweden

[21] Appl. No.: 08/895,029

[22] Filed: Jul. 16, 1997

[30] Foreign Application Priority Data

Jan. 19, 1995 [SE] Sweden ................................. 9500170

[51] Int. Cl.[7] ................................. H04Q 7/38; H04B 7/26
[52] U.S. Cl. ................................. 455/446; 455/450
[58] Field of Search ................................. 455/422, 446, 455/450, 451, 463, 464, 553

[56] References Cited

U.S. PATENT DOCUMENTS

| | | | |
|---|---|---|---|
| 4,723,266 | 2/1988 | Perry | 455/446 |
| 5,095,530 | 3/1992 | Tanaka et al. | 455/422 |
| 5,278,890 | 1/1994 | Beeson, Jr et al. | 455/433 |
| 5,283,817 | 2/1994 | Hara et al. | 455/463 |
| 5,317,623 | 5/1994 | Sakamoto et al. | 455/436 |
| 5,335,355 | 8/1994 | Tanaka et al. | 455/553 |
| 5,420,911 | 5/1995 | Dahlin et al. | 455/553 |
| 5,604,744 | 2/1997 | Andersson et al. | 370/347 |
| 5,633,873 | 5/1997 | Kay et al. | 455/450 |
| 5,732,353 | 3/1998 | Haartsen | 455/450 |
| 5,797,096 | 8/1998 | Lupien et al. | 455/433 |
| 5,799,251 | 8/1998 | Paavonen | 455/517 |
| 5,924,033 | 7/1999 | Carlsson et al. | 455/436 |
| 5,926,764 | 7/1999 | Sarpola et al. | 455/450 |
| 5,940,380 | 8/1999 | Poon et al. | 455/450 |

FOREIGN PATENT DOCUMENTS

| | | |
|---|---|---|
| 558 041 | 9/1993 | European Pat. Off. . |
| WO94/16529 | 7/1994 | WIPO . |

Primary Examiner—David R. Hudspeth
Assistant Examiner—Martin Lerner
Attorney, Agent, or Firm—Burns, Doane, Swecker & Mathis, L.L.P.

[57] ABSTRACT

An arrangement and a method for communication of control data or multiuser signals between an exchange and a number of radio base stations in a communication system in which each base station is connected to the exchange via a connecting arrangement having a number of control channels. At least the part of the connecting arrangement connecting to the base station has one digital and/or one analog control channel which is dedicated for multiuser signals and multiuser signals from the exchange to a radio base station are sent only on the dedicated control channel(s). The radio base station has a receiving arrangement which checks if an incident signal is a multiuser signal. If it is established that it is a multiuser signal, it is distributed to at least a number of the other control channels of that particular base station.

27 Claims, 4 Drawing Sheets

FIG.3a
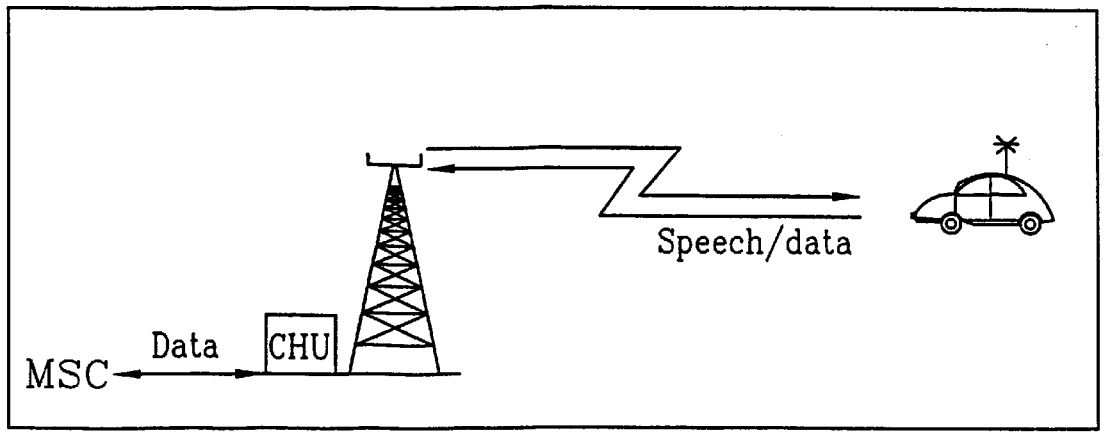
FIG.3b
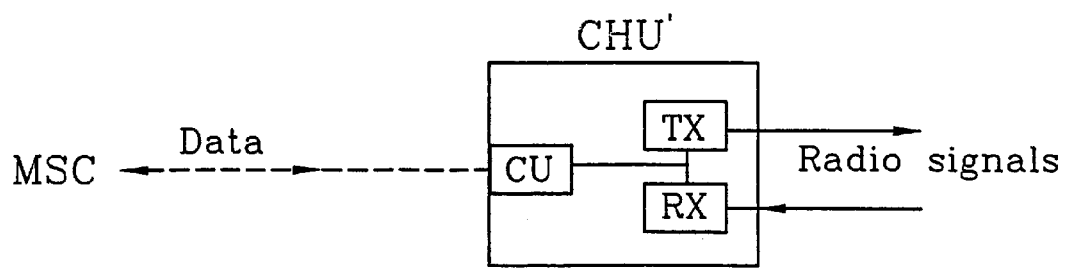
FIG.4
| Check-sum | Data | Type | From | Address |
|---|---|---|---|---|

SYSTEM AND METHOD FOR LOAD REDUCTION IN A MOBILE COMMUNICATION SYSTEM AND A MOBILE COMMUNICATION SYSTEM

TECHNICAL FIELD

The present invention relates to a system for connection or communication between an exchange and a number of radio base stations in a communication system. To an exchange a number of radio base stations are arranged which are connected to the exchange via a connecting arrangement which comprises a number of control channels on which control data are communicated. The invention furthermore relates to a method for communicating control data between an exchange and a number of radio base stations of the communication system on a connecting arrangement for providing the communication which arrangement comprises a number of control channels.

The invention also relates to a base station receiving control data from an exchange. Still further the invention relates to a cellular communication system comprising at least one exchange and a number of radio base stations as well as a number of mobile stations wherein the exchange is connected to the base stations via a connecting arrangement which comprises a number of control channels.

STATE OF THE ART

Today systems exist which comprise a number of exchanges to each of which a number of base stations are connected. For example according to the EIA/TIA-standards (Electronic Industries Association/Telecommunications Industries Association) the base stations are connected to the exchange via pulse code modulation links also named PCM-links. One time slot of a PCM-link is dedicated for control purposes. In a mobile communication system the coverage of a base station is generally divided into either one cell, for example a so called omni-directional cell or into three cells called sector cells each covering a given number of degrees. For each cell there is at least one control channel; there can be one digital control channel or one analog control channel but there can also be both a digital and an analog control channel per cell. The time slot of the PCM-link used for control purposes can at most be shared by three analog and three digital control channels in the known system. In case of a call to a mobile station a so called page signal which is a control message which contains the mobile station identity is broadcasted. In order to find the wanted mobile station the page signal has to be broadcasted over a wide geographic area and it is sent to the base stations through all the control channels.

In a cellular system comprising sector cells the same page signal is sent through all three (in case of just one control channel per cell) or through all six (in case of a digital and an analog control channel per cell) from one and the same exchange to the same base station. If it is not known whether the mobile station is an analog station or a digital station, the page signal has to be sent over the analog as well as over the digital control channels. Just one single call to a mobile station thus gives rise to a large number of page signals over the whole location area or the paging area. Presently most of the signals on the downlink control channels, i.e. from the exchange in a direction towards mobile stations are page signals leaving little room for other signals since the capacity of the single time slot dedicated for control signals is limited. In a particular case the bit-rate on the PCM-link comprises 64 kbit/s. The result is that a bottleneck is formed between the exchange, for example a mobile switching center MSC and the base station. Therefore the time slot of the PCM-link used for control purposes will be saturated before any other part of the MBS subsystem in the case of a high number of page signals. Thus there is a risk that the system gets saturated in case of heavy traffic.

In for example the GSM-system paging is performed slightly differently. One signal is sent from the exchange or the mobile switching center MSC to the base station controller ESC and from the base station controller BSC one page signal per control channel is sent to the base station (or base transceiver station) in the same manner as explained above. Thus it is the connection between a base station controller and the base station which runs the risk of being overloaded or congested for example in case of a heavy traffic case.

SUMMARY OF THE INVENTION

It is an object of the present invention to provide an arrangement for communication of control data or multiuser signals between an exchange and a number of radio base stations wherein the exchange is connected to the base station means via a connecting arrangement which comprises a number of control channels in which the load on the connecting arrangement is reduced. It is thus an object of the invention to reduce the number of signals having to be sent for one single connection which are common and identical for all the control channels of a base station which signals here are referred to as multiuser signals. User in this context refers to transceivers as users of the signal. It is also an object of the present invention to reduce the load on the receiving arrangement, e.g. a processing system in the radio base station. Particularly the invention intends to provide a system for paging, i.e. defining the location of a mobile subscriber or a mobile station which system is efficient and which does not unnecessarily produce a high load on the link or the connecting arrangement between the exchange, particularly a telephone exchange, and the base station, an exchange here taken to mean also a base station controlling means, a base station controller BSC.

It is also an object to provide a connecting arrangement between an exchange and a radio base station which has a high capacity.

Another object of the present invention is to provide a method for communicating multiuser signals (control data) such as e.g. page signals or short message service signals between an exchange and a number of radio base stations with a reduced risk of overloading the connecting arrangement in case of many simultaneous actions. It is also an object to provide a method which reduces the load on the receiving arrangement of the radio base station.

Still a further object of the invention is to provide a communication system comprising a number of exchanges, a number of radio base stations and a number of mobile stations wherein the communication of multiuser signals such as paging signals or short message service signals etc. can be carried out in an efficient manner with a reduced risk of overloading or congestion of a connecting arrangement connecting radio base stations with an exchange and wherein the load on the receiving arrangements is reduced.

The invention also has as an object to provide a radio base station which enables and fulfils the above mentioned objects.

These as well as other objects are achieved through a system and a method respectively for communication of control data between an exchange and a number of radio base stations wherein the connecting arrangement which comprises a number of control channels is provided with one digital and/or one analog control channel which is dedicated for multiuser signals. The radio base station comprises a receiving arrangement which checks if an incident signal is a multiuser signal, and if it is a multiuser signal, it distributes said multiuser signal to at least a number of the control channels of that particular base station. Particularly the multiuser signals comprise page signals. According to particular embodiments they may also comprise so called short message service signals or other similar signals. Advantageously multiuser signals are only sent on the dedicated control channel and on no other channel. However, also other signals may be sent on this control channel.

The invention also provides for a communication system through which the load on the connecting arrangement which comprises a number of control channels and which connects an exchange with a radio base station through dedicating either one digital control channel or one analog control channel or one of each of an analog and a digital control channel for multiuser signals of a given kind such as e.g. page signals, short message service signals or similar.

Yet further the invention provides a radio base station communicating with an exchange which provides control data wherein the base station comprises processing means for checking if a control signal coming in on a control channel dedicated for control purposes is a multiuser signal and if it is, distributing the multiuser signal to other control channels corresponding to the same cell as the control channel dedicated for multiuser signals.

Through the invention the number of multiuser signals which have to be sent in order to find the appropriate base station or the wanted mobile station is considerably reduced in that one and the same signal does not have to be sent on more than one or two (e.g. in case it is not known if the mobile station is an analog station or a digital station it may be sent on two) control channels from one and the same exchange to the base station or in the case of e.g. the GSM-system, from the base station controller to the base (transceiver) station. Thus the number of multiuser signals such as page signals which have to be distributed or broadcasted is considerably reduced as compared to known arrangement or systems. Another advantage of the invention is that the reduced load on the control channels by multiuser signals will free capacity in the control channels for other traffic events and that it also prevents or limits the risk of a bottleneck being produced both on the connection to the base station and in the receiving processor.

BRIEF DESCRIPTION OF THE DRAWINGS

The invention will in the following be further described in a non-limiting way under reference to the accompanying drawings in which:

FIG. 3a illustrates a base station with a multichannel unit communicating with a mobile switching center MSC and a mobile station, FIG. 3b illustrates one separate channel unit of the multichannel unit of FIG. 3a, FIG. 4 illustrates an example of the content of a data signal, FIG. 5 schematically illustrates a base station modified according to the invention.

DETAILED DESCRIPTION OF THE INVENTION

Figure 1:
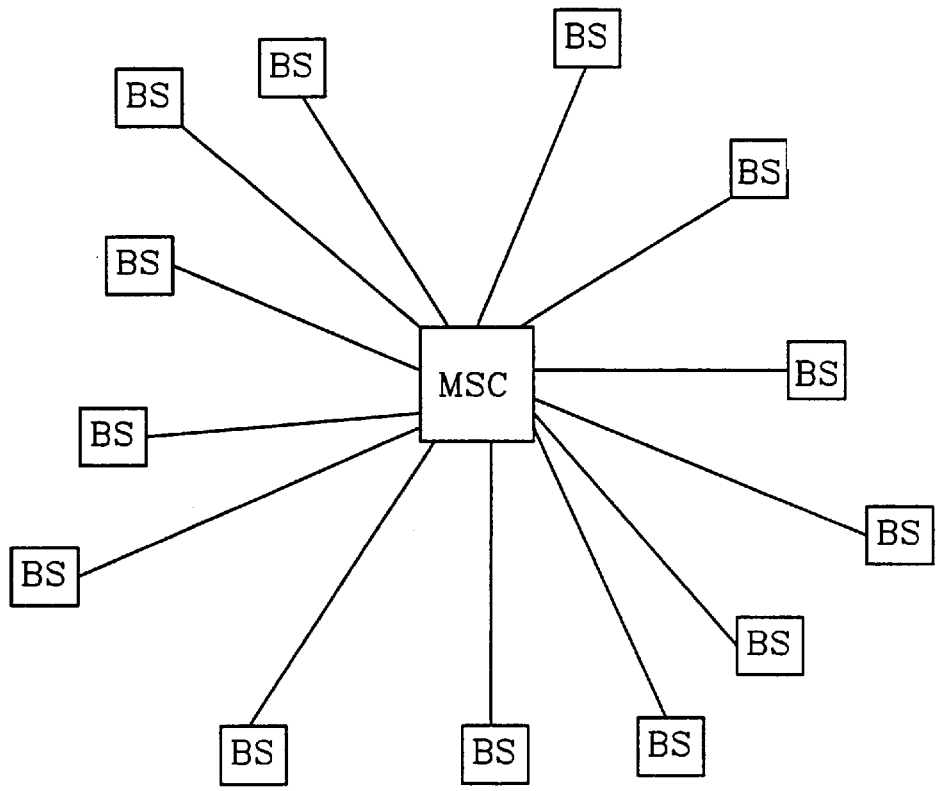
FIG. 1 schematically illustrates the distribution of multiuser signals to a number of base stations, FIG. 2 schematically illustrates communication between an exchange, a base station with three cells and a mobile station.

The invention relates to mobile communication systems in general and in the following embodiment the invention will be described in relation to a cellular communication system.

The mobile communication system generally comprises a number of mobiles switching centers MSC, home location registers, base stations BS and mobile stations MS. It is the mobile switching center MSC that forms an interface with e.g. the public switched telephone network. A number of base stations BS are connected to a mobile switching center MSC via digital and/or analog lines. Areas covered by one specific base station BS are called cells. Thus a base station may serve more than one cell i.e. a cell relates to a geographic area wherein a call can be effected with use of one and the same radio channel. The cells which are connected to a particular mobile switching center MSC are said to a form a so called MSC area.

Now a particular kind of multiuser signals, namely page signals will be discussed. The functioning of the invention is the same for other multiuser signals. If a mobile station is allowed to move freely within an MSC-area without notifying the exchange about its exact location, the exchange MSC has to send page signals in parallell to all base station, or the mobile station is paged parallelly from all the cells in the area. In some systems so called location areas are introduced which form areas within one MSC area. Then paging will be done in parallel from all cells within the location area instead which reduces the load on the paging channel. The base stations BS comprise channel units each comprising radio transmitter, radio receiver and control unit. The control unit is used for data communication with the mobile switching center MSC and for data signalling with a mobile station MS on the radio path. The mobile stations MS comprise a radio transmitter, radio receiver and logic unit for data signalling for the base station BS and a telephone part.

As referred to above a base station BS can communicate with the mobile stations MS which are within a given area close to the base station BS. The cells i.e. the areas which are covered by one base station can be of different types, for example omnidirectional cells or sector-cells generally depending on the kind of antennas which are used. An omni-directional cell generally comprises one omni-directional antenna whereas in the case of sector cells e.g. three directional antennas may be provided each covering one cell. Thus, using sector cells, the base station BS serves three cells. In the described system, a mobile station MS moves freely within the service area of the mobile switching center MSC or, in further particular embodiments, the service area is divided into a number of location areas. In the case of an undivided MSC service area the mobile station can move freely within that area without informing the exchange MSC about its location and thus the exchange MSC does not know the exact location of the mobile station as referred to in the foregoing. In case the service area is divided into location areas, the mobile station informs the mobile switching center MSC when it moves from one location area to another which is also known as location area registration. A call to a mobile subscriber must in the first case be sent via all cells in the service area of the mobile switching center MSC. If a location area division is applied, paging of the mobile station is performed by all cells of that particular location area.

As will be further discussed later on, each cell comprises at least one control channel, generally one analog or one digital or both an analog and a digital control channel. According to the invention one of the control channels is dedicated for multiuser signals if there are either digital or analog control channels. According to one embodiment of the invention, one control channel is dedicated for multiuser signals which can be either digital or analog also when both digital and analog control channels are present. This requires a communication function between digital and analog control channels, i.e. a connection between the software relating to the respective control channels. More particularly it is also possible to use the one having the lowest load in which case load controlling means may be used. If there are both digital and analog control channels, one analog and one digital control channel may in an advantageous embodiment as referred to in the foregoing be dedicated for multiuser signals.

The invention relates to substantially all signals which are common and identical for all (e.g. 3 or 6 but there can of course also be other numbers) control channels. In this application those signals are generally referred to as multiuser signals. In the particularly described embodiments are referred to page signals but of course the invention likewise applies to other multiuser signals as referred to above. In this context (multi)user means transceivers as users of the signal.

In FIG. 1 is very schematically illustrated an example of a distribution of page signals here merely indicated through the lines to the base stations for illustrative purposes from one exchange MSC to a number of base stations BS for one call to a mobile station. In today's known systems every link or connecting arrangement must forward up to 6 identical page signals every time; generally 3,6 refers to the case when it is not known whether the mobile station is analog or digital as discussed to above.

In a particular embodiment of the invention each cell comprises one control channel. Thus, if the base station BS serves three sector cells (see FIG. 2), it is equipped with three channel units. The control channels are used only for control data.

Figure 2:
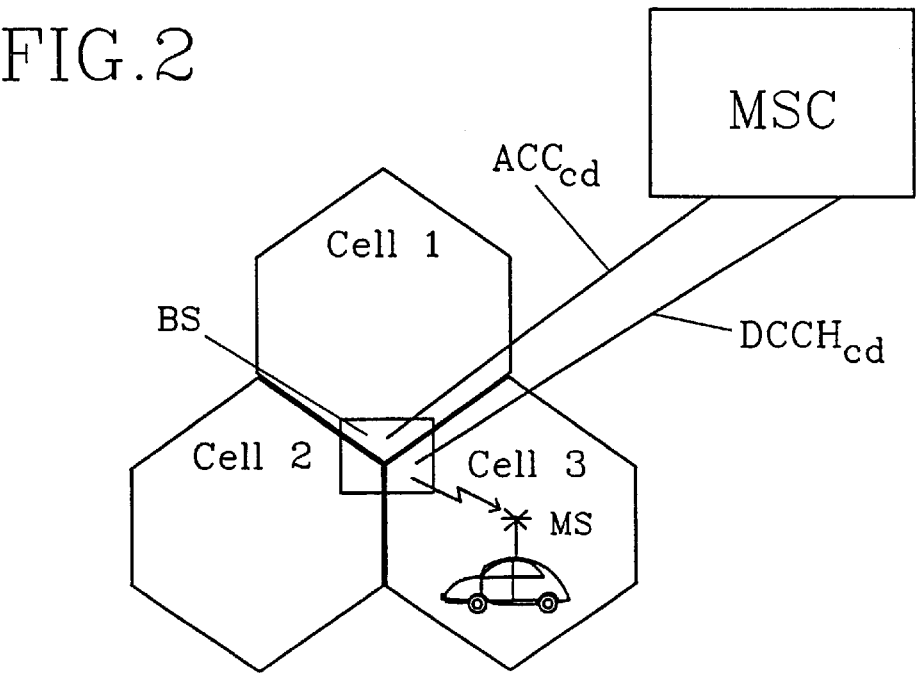

In FIG. 2 is shown a mobile switching center MSC, a base station BS covering three cells (sector cells) 1,2,3, and a mobile station MS. Multiuser signals are sent to the base station BS from the mobile switching center MSC, in this case page signals, on one dedicated analog control channel and one dedicated digital control channel $ACC_{cd}$ and $DCCH_{cd}$ respectively. In the shown embodiment there is one dedicated control channel of each kind, analog and digital, but it could also be only an analog control channel or only a digital control channel, for example depending on if it is an analog or a digital station. FIG. 3a schematically illustrates the communication between the mobile switching center MSC, the base station BS and a mobile station MS. Since the base station BS serves three sector cells there are three channel units CHU'. In FIG. 3a there is illustrated a multi channel-unit CHU which in this particular embodiment comprises three channel units CHU' as illustrated in FIG. 3b. Each channel unit CHU' comprises a control unit CU, a transmitter TX and a receiver RX. As referred to above a number of base stations BS are connected to one exchange MSC via pulse code modulation links PCM links. The PCM link here merely comprises one single time slot TS being used for control purposes and this single time slot TS can at most be shared by three analog and three digital control channels ACC, DCCH. These limitations relating to the PCM-link are relevant in the present context.

When there is a call to a mobile station MS a page signal is broadcasted to a number of base stations BS in order to find the one covering the relevant mobile station MS. The page signals are sent to the base stations BS through the dedicated control channels $ACC_{cd}$ and/or $DCCH_{cd}$. As referred to above, also if there are both analog and digital control channels according to a particular embodiment, the multiuser signals may be sent only on either the digital control channel or the analog control channel. If the type of the mobile station is known, the page signal is just sent on either the analog or the digital control channel. In this case page signals (or any other multiuser signals) are only sent on the one (or maximum two if it is not known if the mobile station is analog or digital according to a particular embodiment as referred to in the foregoing) dedicated control channel to each base station.

The multi-user-signal to the base station BS comprises a number of data fields as illustrated in FIG. 4.

In the shown embodiment it is the first receiving arrangement of the base station BS which e.g. may be an operating system or an application, that examines the signal frame. I.e. a receiving processor unit reads the data signal, the type field indicates if it is a multiuser signal or even more particularly even a page signal as exemplified in FIG. 4. The first receiving arrangement of the base station distributes a signal to a number of or all (e.g. the other two or four, of analog and/or digital) control channels or cells. This is also very schematically indicated in FIG. 5. Here PCM-links comprising 24 time slots $TS; TS_c, TS_{c1}$ are received in a base station BS. The time slots $TS_c$; $TS_{C1}$ represent the time slot used for control purposes. The other time slots TS may comprise speech etc. The time slots $TS_{c1}$ are also for control purposes but do not comprise multiuser signals. (The number of time slots, control slot for control purposes can of course be different in different systems to which the present invention naturally also relates).

The receiving process in the Extended Module Regional Processor EMRP of the base station has to read the content of a number of data fields in order to decide which action is to be taken with the data information comprised in a received signal packet. A possible content as already mentioned above is among other some indication of the type of the signal, e.g. a page signal, or the type of signal to be distributed to some of or all the control program processes, i.e. the control channels. If it is not deemed necessary to provide the multiuser signal to all the other control channels, e.g. in case of non-relevance or similar it is only distributed to the other(s). According to one advantageous embodiment every control channel comprises one executing processor but there may also be one common processor for all control channels or some of them. In the following the receiving program process will be briefly explained. A signal or a control signal enters the base station BS wherein an Exchange Terminal Board ETB extracts the time slots $TS_c$; $TS_{C1}$ dedicated for control purposes. The time slots TS dedicated for speech are forwarded to the transceivers TRX via the time switch TSW over a speech data bus. This is not expressively indicated in FIG. 5; that is so for reasons of clarity and since it is not relevant for the present invention. The addresses of the control time slots $TS_{c1}$, $TSC_1$ are read in the Signalling Terminal Regional STR, i.e. it is settled to which Extended Module Regional Processor $EMRP_X$;$EMRP_{CMU}$ they are to be forwarded. Here the time slots $TS_c$ for control purposes relating to multiusers signals are transferred to the multiuser Extended Module Regional Processors $EMRP_{CMU}$ whereas other time slots $TS_c$ for control purposes (thus not relating to multiuser signals) are either transferred to the same processor (not shown in FIG. 5 for reasons of clarity) or to $EMRP_X$. In reality there may of course be more than one further processor dealing with non-multiuser signals or they may generally all be handled by the $EMRP_{CMU}$ etc.; this is however irrelevant for the present invention.

According to one advantageous embodiment of the invention it is thus the first receiving software of the base station (in the $EMRP_{CMU}$) that distributes a multiuser signal to the other two control channel software processes after having settled from the header of the signal that it is a multi-user signal. The extension module examines the signal field and the signal is forwarded to the final destination which will be in the transceivers TRX. In the shown embodiment every cell has at least one transceiver which is dedicated for handling the functions of the control channel. If thus a page signal (or another multiuser signal) is transferred only on one control channel the extension module regional processor $EMRP_{CMU}$ checks the field "types" and if it is e.g. a page signal, the signal is distributed to the other two control channel processors which hence is done by the first receiving unit $EMRP_{cmu}$ which comprises hardware as well as software. Thereafter each page signal is sent by the three control channel processors to the transceivers of the respective process.

Figure 5:
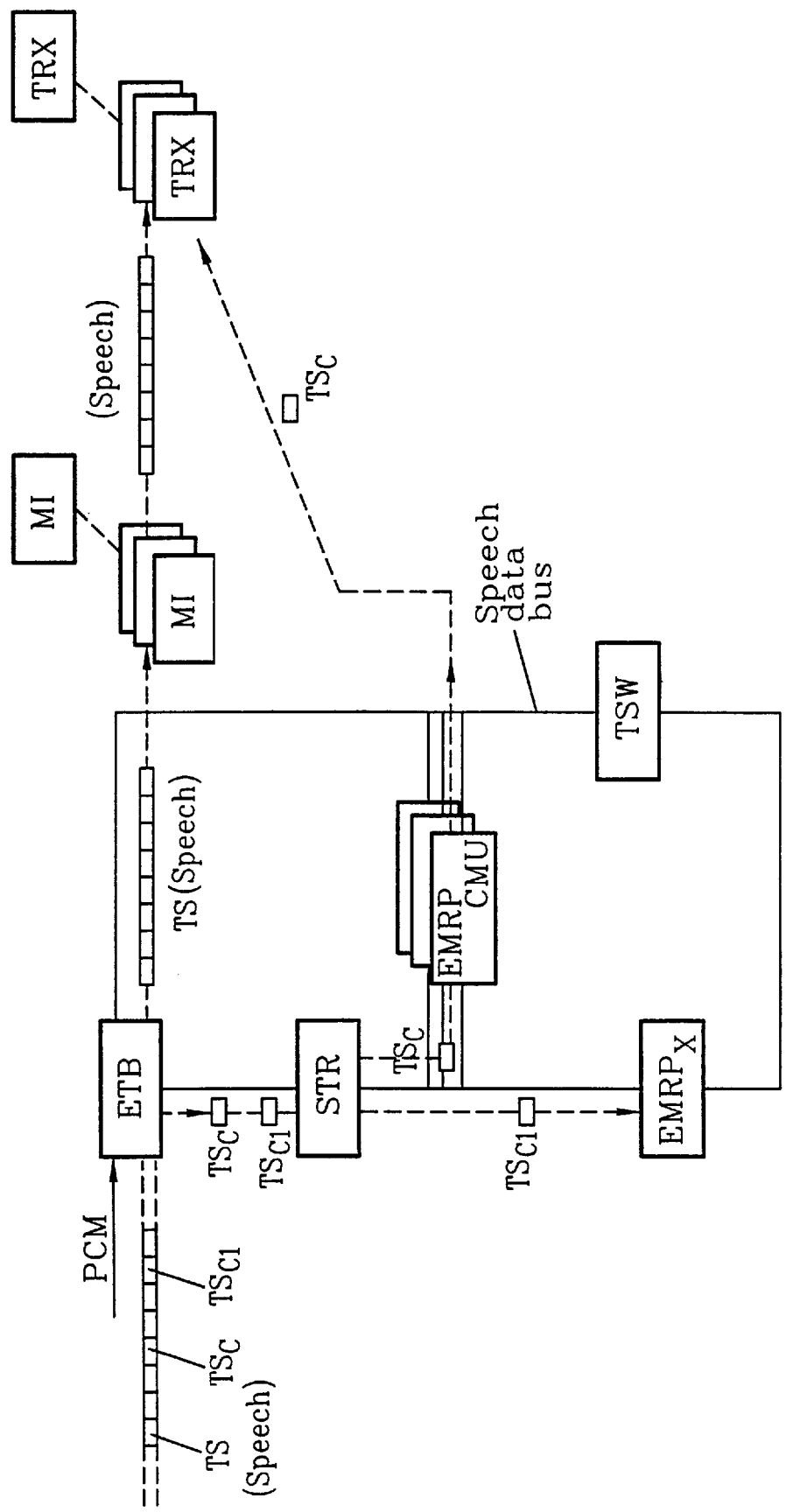

In FIG. 5 the speech slots TS reaches the transceivers TRX via multiplexing interfaces MI which however not are necessary for the functioning of the present invention but merely relate to one specific embodiment including such. This is however not necessary.

Figure 6:
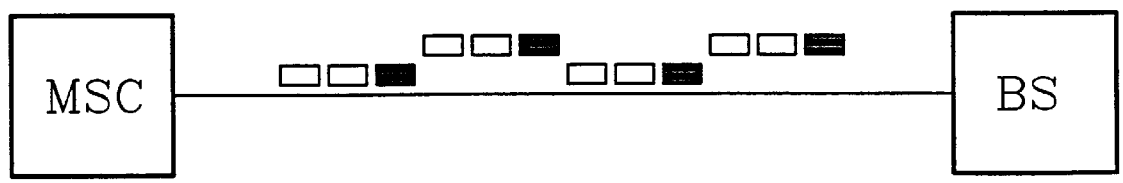
FIG. 6 illustrates a comparison between the load on the connecting arrangement of a known system and a system according to the invention and FIG. 7 illustrates an embodiment relating to the GSM-system.

FIG. 6 briefly illustrates the load on the connecting arrangement or the PCM link which is caused by four page signals on three control channels as in hitherto known systems as compared to a system according to the invention wherein the link is loaded by four paging signals on just one control channel. All the boxes, filled plus non-filled represent the load of the prior art system whereas the filled boxes represent a load by the system according to the invention.

Figure 7:
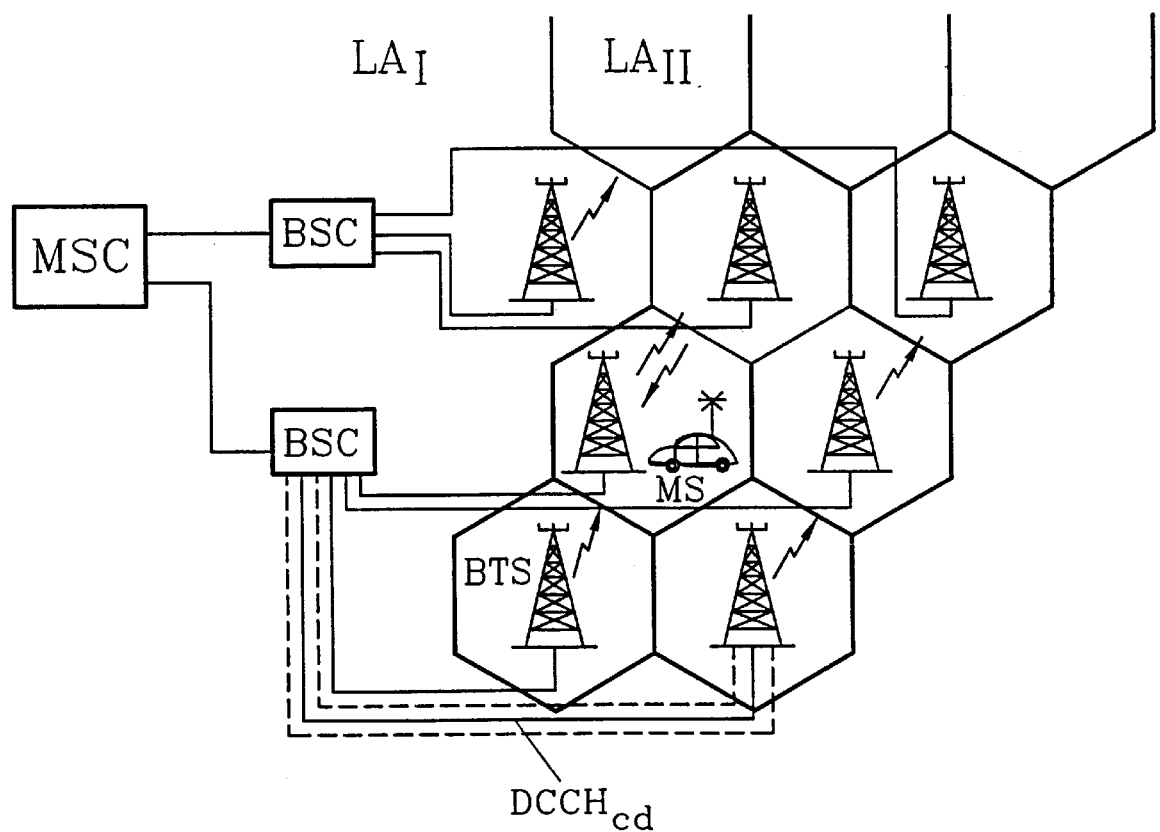

In FIG. 7 another embodiment is schematically illustrated wherein the system concerned is the GSM-system. Similar to the embodiment described above a call to a mobile station MS will be routed to the visitor location register of the exchange MSC/VLR in which the mobile station MS is registered.

The exchange, more particularly the MSC/VLR then sends a paging message to the mobile station MS. This page signal (being one of a number of different multiuser signals to which the invention applies) will be distributed (broadcasted) all over a given area, in this particular case a location area $LA_I$ will send a page signal on a control channel $DCCH_{ed}$ dedicated for multiuser signals (in this case page signals). In the shown example the cells are three sector cells and the mobile station is digital and therefore there are three digital control channels DCCH per base station controller BSC. In the illustrated GSM-embodiment each cell has a base transceiver station BTS which operates on a set of radio channels. A base station controller BSC controls a number of base transceiver stations BTS and a number of BSCs are controlled by one MSC.

As already referred to the invention relates to all signals which are common or identical for the control channels between a base station BS and an exchange (Base Station Controller BSC and exchange MSC). More generally can be referred to the connection between a base station and the next, hierarchically seen, higher station, e.g. Base Station Controller BSC, or Mobile Switching Center MSC etc. One example as already discussed above relates to page signals and another example of such signals are so called short message service signals which are of multiuser type.

With the invention the load on the control channel (downlink, i.e. from exchange towards mobile station) is reduced and the risk of a bottleneck being produced is also reduced. Also the load on the receiving processor of the base station is reduced thus also preventing a bottleneck from being produced there.

Also in other aspects the invention is not limited to the shown embodiments but can be varied in a number of ways. For example it relates to digital as well as analog standards among which AMPS (Advanced mobile phone system), D-AMPS (Digital-AMPS) or ADC, PDC, JDC, GSM, TACS, PCS etc. can be mentioned.

I claim:

1. An arrangement for communication of control data between an exchange and a number of radio base stations, each serving a given area, in a communication system wherein each base station is connected to the exchange via a connecting arrangement having a pulse code modulation link and a number of control channels that include at least one digital and/or one analog control channel dedicated for multiuser signals the multiuser signals being signals that are sent for one single connection and are common for all of said control channels of a base station, said multiuser signals from the exchange being sent to a radio base station on at least the dedicated control channel(s), the arrangement comprising in a radio base station a receiving arrangement which checks if an incident signal is a multiuser signal, and if the incident signal is a multiuser signal, the receiving arrangement distributes said multiuser signal to at least a number of other control channels of that particular base station, and a transceiver for each cell served by the base station for handling control channel functions.

2. The arrangement of claim 1, wherein the radio base station covers at least one cell and has at least one control channel per cell.

3. The arrangement of claim 1, wherein the connecting arrangement has one dedicated control channel, and that dedicated control channel is a digital control channel.

4. The arrangement of claim 1, wherein the connecting arrangement has one dedicated control channel, and that dedicated control channel is an analog control channel.

5. The arrangement of claim 1, wherein the connecting arrangement has two dedicated control channels of which one is an analog control channel and one is a digital control channel.

6. The arrangement of claim 1, wherein the radio base station covers three cells.

7. The arrangement of claim 6, wherein the connecting arrangement has three analog and/or three digital control channels of which one digital and/or one analog channel is a dedicated control channel.

8. The arrangement of claim 1, wherein the connecting arrangement has three or six control channels.

9. The arrangement of claim 1, wherein one time slot of the pulse code modulated link is used for multiuser signals.

10. The arrangement of claim 1, wherein the multiuser signals comprise page signals that are sent only on the dedicated control channel.

11. The arrangement of claim 1, wherein the receiving arrangement further comprises one of a first intelligent receiving arrangement and software of an extended module regional processor.

12. The arrangement of claim 1, wherein the receiving arrangement distributes the multiuser signal to control channel processes of other control channels which send the multiuser signal to the respective cell transceivers.

13. The arrangement of claim 12, wherein the receiving arrangement includes an operating system.

14. The arrangement of claim 12, wherein the receiving arrangement includes an application part.

15. The arrangement of claim 1, wherein the receiving arrangement distributes the multiuser signal to all control channels of that particular base station.

16. The arrangement of claim 1, wherein the connecting arrangement comprises one digital and/or analog control channel dedicated for multiuser signals from the exchange to the base station.

17. A radio base station serving a given area having at least one cell in handling radio communication with a number of mobile stations and further forming an interface to an exchange, comprising:
    means for signalling on a number of control channels of a connecting arrangement with the exchange;
    a receiving processor for examining types of transmitted control signals incident on a control channel dedicated for multiuser signals, the multiuser signals being signals that are sent for one single connection and are common for all of said control channels of a base station;
    at least one executing processor corresponding to at least one control channel;
    at least one transceiver for each cell;
    wherein said connecting arrangement has a pulse code modulation link, and the receiving processor distributes the incident signal if it is a multiuser signal to the executing processor(s) of at least a number of the other control channels and the executing processor(s) forward the multiuser signal to each corresponding transceiver.

18. The radio base station of claim 17, wherein a dedicated control channel is provided for at least one of analog signals and digital signals.

19. An arrangement for communication of multiuser signals between an exchange and a number of radio base transceiver stations groupwise connected to base station controllers via connecting arrangements having a pulse code modulation link and a number of control channels between the base station controller and the base transceiver station, comprising a connecting arrangement between a base station controller and a base transceiver station that includes one digital control channel dedicated for multiuser signals, wherein the multiuser signals being signals that are sent for one single connection and are common for all of said control channels of a base station, are sent only on the dedicated control channel.

20. The arrangement of claim 19, wherein the multiuser signals are distributed to other control channels connecting the base station controller with the base transceiver station by a receiving processor.

21. A method for reducing the load on control channels in a cellular mobile communication system having at least one exchange and a number of radio base stations each covering a given area including at least one cell, and a number of mobile stations wherein each exchange is connected to a number of radio base stations via a connecting arrangement having a pulse modulation link and a number of control channels, comprising the steps of:
    sending from the exchange multiuser signals the multiuser signals being signals that are sent for one single connection and are common for all of said control channels of a base station, to the radio base stations over one digital and/or analog control channel dedicated for multiuser signals;
    checking on a receiving arrangement in the radio base station if an incident signal is a multiuser signal;
    if the incident signal is a multiuser signal, distributing the multiuser signal by processing means to at least a number of other control channels interconnecting the exchange and the radio base station; and
    sending from an executing processor of each respective cell the multiuser signal to a transceiver of that respective cell.

22. The method of claim 20, wherein the multiuser signals are page signals.

23. A mobile communication system, comprising a number of exchanges to each of which a number of radio base stations are connected, each base station covering a given area including at least one cell, with at least one control channel per cell, wherein the base station and the exchange are interconnected via a connecting arrangement having a pulse code modulation link and a number of control channels for control data, one digital and/or one analog control channel between an exchange and a radio base station is dedicated for multiuser signals, the multiuser signals being signals that are sent for one single connection and are common for all of said control channels of a base station, the radio base station includes a receiving arrangement for checking if an incident signal is a multiuser signal, if the incident signal is a multiuser signal for distributing the multiuser signal to at least part of other control channels connecting the base station with the exchange, and each cell has an associated transceiver for handling control channel functions.

24. The mobile communication system of claim 23, wherein the multiuser signals are page signals.

25. The mobile communication system of claim 23, the multiuser signals are short message service signals.

26. The mobile communication system of claim 23, wherein communication is conducted according to one of the advanced mobile phone system (AMPS) and the digital advanced mobile phone system (D-AMPS).

27. The mobile communication system of claim 23, wherein communication is conducted according to a GSM-system and the dedicated control channels are provided between a base station controller and the base transceiver station.

* * * * *